(12) United States Patent
Narad et al.

(10) Patent No.: US 7,447,233 B2
(45) Date of Patent: Nov. 4, 2008

(54) PACKET AGGREGATION PROTOCOL FOR ADVANCED SWITCHING

(75) Inventors: Charles Narad, Los Altos, CA (US); Dave Gish, Riverdale, NJ (US)

(73) Assignee: Intel Corporation, Santa Clara, CA (US)

( * ) Notice: Subject to any disclaimer, the term of this patent is extended or adjusted under 35 U.S.C. 154(b) by 712 days.

(21) Appl. No.: 10/953,674

(22) Filed: Sep. 29, 2004

(65) Prior Publication Data

US 2006/0072615 A1 Apr. 6, 2006

(51) Int. Cl.
*H04J 3/24* (2006.01)

(52) U.S. Cl. .................. 370/473; 370/474; 370/252; 370/352

(58) Field of Classification Search .............. 370/470, 370/473, 474, 252, 253, 389, 396, 352, 392
See application file for complete search history.

(56) References Cited

U.S. PATENT DOCUMENTS

| | | | |
|---|---|---|---|
| 4,999,835 A | | 3/1991 | Lagoutte |
| 6,614,808 B1 | | 9/2003 | Gopalakrishna |
| 6,665,313 B1 * | | 12/2003 | Chang et al. ............... 370/469 |
| 2003/0147385 A1 | | 8/2003 | Montalvo et al. |
| 2004/0128410 A1 | | 7/2004 | Mayhew et al. |
| 2004/0151206 A1 * | | 8/2004 | Scholte ...................... 370/473 |
| 2004/0233933 A1 * | | 11/2004 | Munguia ..................... 370/473 |
| 2005/0018670 A1 * | | 1/2005 | Shigematsu et al. ......... 370/389 |
| 2005/0207436 A1 * | | 9/2005 | Varma ........................ 370/412 |
| 2006/0004837 A1 * | | 1/2006 | Genovker et al. ........... 707/102 |
| 2006/0013255 A1 * | | 1/2006 | Kuskin ....................... 370/473 |
| 2006/0050693 A1 * | | 3/2006 | Bury et al. .................. 370/389 |
| 2006/0056443 A1 * | | 3/2006 | Tao et al. .................... 370/462 |

FOREIGN PATENT DOCUMENTS

WO  WO 00/72532 A1  11/2000

OTHER PUBLICATIONS

PCT/US2005/035379, PCT International Search Report and Written Opinion, (Mar. 21, 2006).
Lee, Gary, "Advanced Switching in Communication Systems," Version 0.4, 19th Nov. 2003, pp. 1-7, Vitesse Semiconductor Corporation, Camarillo, CA, U.S.A. http://www.asi-sig.org/education/usage/vitesse_communications_usage.pdf.
PCI Industrial Computer Manufacturers Group. "Advanced TCA™: System Fabric Plane Format Specification," 10th Aug. 2004, pp. iii-v, 1-27.

* cited by examiner

*Primary Examiner*—Ricky Ngo
*Assistant Examiner*—Gary Mui
(74) *Attorney, Agent, or Firm*—Blakely, Sokoloff, Taylor & Zafman LLP

(57) ABSTRACT

A method and system to aggregate packets. A plurality of packets are received from a medium. The packets are aggregated into a single Advanced Switching ("AS") packet and transmitted onto an AS fabric as a single AS packet.

32 Claims, 6 Drawing Sheets

PACKET AGGREGATION PROTOCOL FOR ADVANCED SWITCHING

TECHNICAL FIELD

This disclosure relates generally to Advanced Switching ("AS"), and in particular but not exclusively, relates to multiplexing/aggregating multiple small packets into a single AS packet for communication across an AS fabric.

BACKGROUND INFORMATION

Backplane fabrics in communications equipment are often constructed of specialized packet switching networks that move data between end nodes of the fabric within a communication protocol agreed upon by the end nodes. A fabric should be capable of transporting a variety of upper layer protocols ("ULPs") between the end nodes. One technique for supporting and transporting such variety of ULPs across a single fabric is encapsulation and extraction at the end nodes.

Encapsulation enables an ingress end node to receive a data packet from an external medium, encapsulate the data packet within a fabric protocol, and transport the encapsulated data packet to an egress end node of the fabric. To be flexible, the fabric should provide a number of fabric services capable of supporting a wide variety of ULPs (e.g., IP, TCP/IP, UDP, etc). To do so, the fabric may append a fabric header (and optionally a fabric footer) to provide switching and/or routing functionality including Class of Service ("CoS"), Quality of Service ("QoS"), prioritization, reordering, data integrity, error reporting, congestion management, flow control, reliable delivery, fabric management, and the like. The egress end node subsequently strips off these headers and footers to extract the data packet before the data packet is delivered to a receiving external medium.

However, implementing a switching fabric capable of supporting such diverse ULPs via encapsulation and extraction may incur substantial overhead as a result of the appended headers and footers. When large data packets are delivered across a switch fabric, the overhead may be negligibly small. However, when streams of small packets are transported across a switch fabric, the overhead can become substantial. In fact, in some cases the bandwidth consumed by overhead can rival or even exceed that consumed to transport the actual data. Example ULPs where streams of small packets are common include, Internet Protocol ("IP"), ATM AAL-0 (Asynchronous Transfer Mode ATM Adaptation Layer-0), and voice control channels.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for aggregating multiple packets received from a medium into a single Advanced Switching ("AS") packet for transport across an AS fabric are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
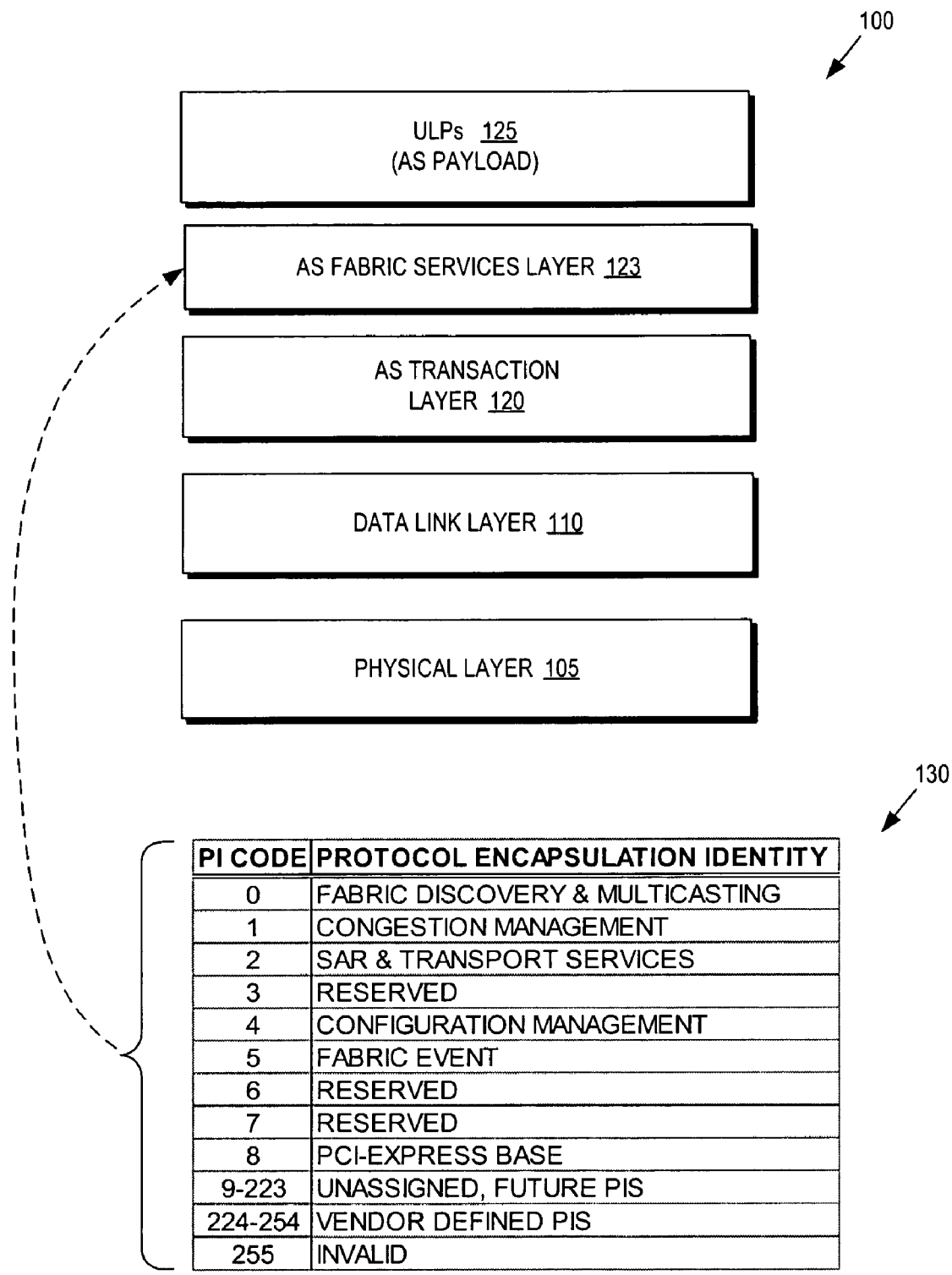
FIG. 1 is a block diagram illustrating a protocol stack for an Advanced Switching ("AS") architecture, in accordance with an embodiment of the present invention.

FIG. 1 is a block diagram illustrating a protocol stack 100 for an Advanced Switching ("AS") architecture, in accordance with an embodiment of the present invention. As shown in FIG. 1, AS is a multi-layered protocol including a physical layer 105, a data link layer 110, an AS transaction layer 120, and an AS fabric services layer 123. Physical layer 105 is devoted to transmitting raw bits over a communication channel, data link layer 110 takes the raw transmission facility and transforms it into a line that appears free of undetected transmission errors to AS transaction layer 120, while AS transaction layer 120 is substantially concerned with accepting data from Upper Layer Protocols ("ULPs") 125, splitting the data into segments if need be, passing the segmented data to data link layer 110, and ensuring that the pieces all arrive correctly at the other end. Data link layer 110 and AS transaction layer 120 may also negotiate configuration of operating modes for their respective layers with their peer counterparts.

At end nodes, AS transaction layer 120 can be logically partitioned into two sets of interfaces—Protocol Interfaces and Fabric Interfaces. Fabric interfaces handle system discovery, configuration, events signaling, congestion management, and segmentation/reassembly. The protocol interfaces are carriers of encapsulated ULPs 125 and interact directly with ULPs 125. The AS Specification (e.g., AS Core Architecture Specification v1.0, 2003) defines a standard set of protocol interfaces ("PIs"), as illustrated in table 130. PIs 0 to 7 are reserved for various fabric management tasks and fabric services, while PIs 8 to 256 are used to tunnel ULPs 125 across an AS fabric. In one embodiment of the present invention a new PI, hereafter referred to as PI-MUX, is defined to aggregate packets received from external media into a single AS packet for transport across an AS fabric. Embodiments of this PI-MUX are capable of aggregating packets of a variety of different protocols into a single AS packet. Embodiments are further capable of aggregating a plurality of small packets or at least one small packet and a segment of a large packet into a single AS packet. The PI-MUX can be provided as a service of the AS fabric and assigned an available PI code to be invoked by AS transaction layer 120.

Figure 2:
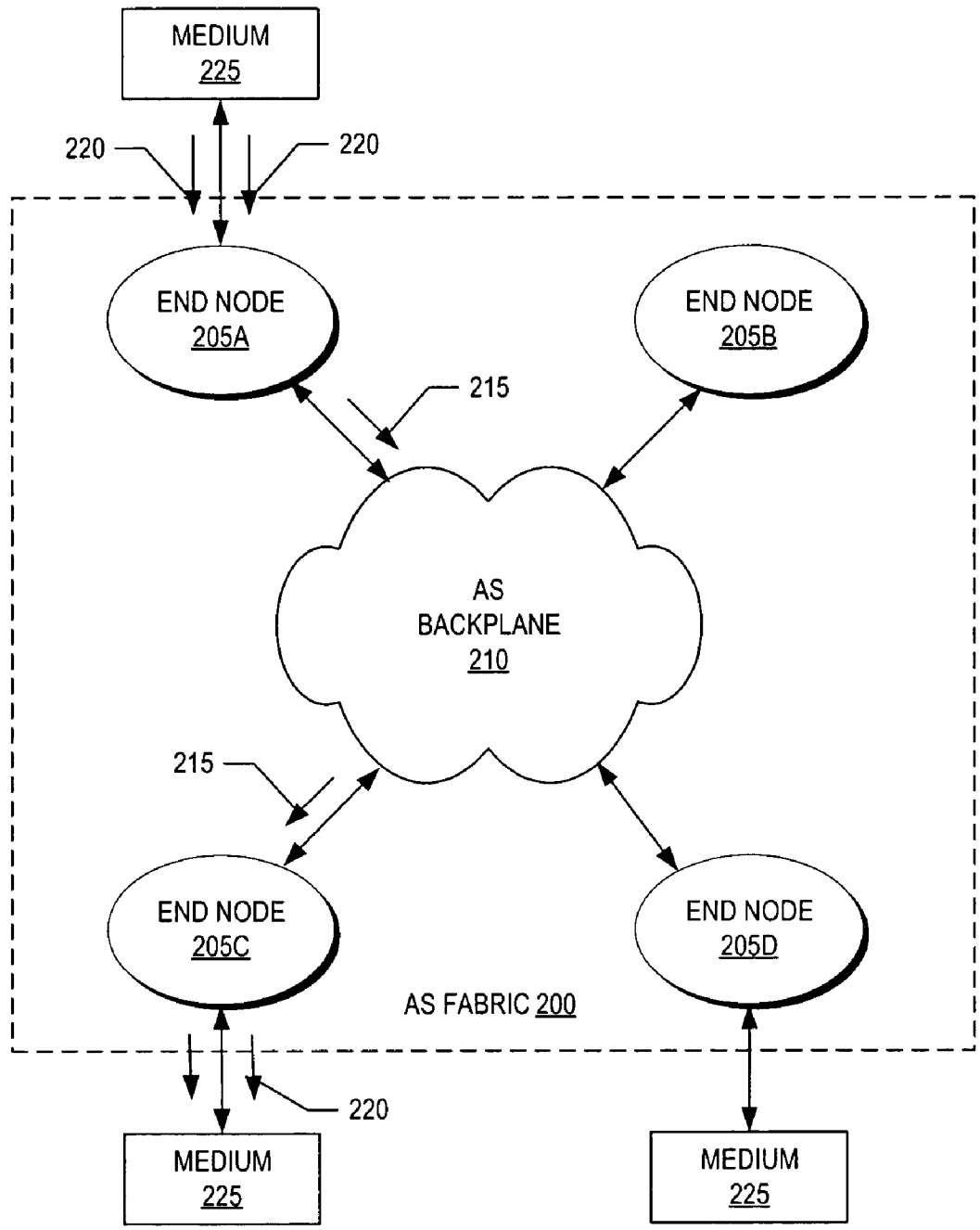
FIG. 2 is a block diagram illustrating an AS fabric, in accordance with an embodiment of the present invention.

FIG. 2 is a block diagram illustrating an AS fabric 200, in accordance with an embodiment of the present invention. The illustrated embodiment of AS fabric 200 includes end nodes 205A, B, C, and D (collectively 205), and an AS backplane 210. AS backplane 210 may include one or more AS switch elements (not illustrated) for routing AS packets 215 across AS fabric 200. Each end node 205 may further couple to receive packets 220 from an external medium 225 and to transmit packets 220 thereto. Although the embodiment of FIG. 2 illustrates four end nodes 205 coupled in a star topology, AS fabric 200 may include more or less end nodes 205 coupled together using other well-known fabric topologies including dual-star, mesh, and the like.

External media 225 may include any number of networks and/or data sources/destinations, including Ethernet, an Asynchronous Transfer Mode ("ATM") channel, a fiber channel ("FC"), an external PCI Express channel, storage interconnects such as Serial ATA ("SATA"), Serial SCSI ("SAS"), or the like. AS packets 215 encapsulating a variety of protocols may also originate and/or terminate at an end node 205. AS backplane 210 may be implemented using a high-speed serial bus or other physical layer medium providing sufficient bandwidth for the particular implementation. In one embodiment, AS backplane 210 includes PCI Express high-speed serial links and AS switches. AS backplane 210 may support peer-to-peer connectivity, as well as, host/slave configurations for higher-level protocols. The AS architecture allows flexible interconnect topologies, allowing internal AS switches (not illustrated) and end nodes 205 to freely work together.

End nodes 205 each execute protocol stacks 100 to aggregate and transport packets 220 across AS fabric 200. When packets 220 are received, for example, at end node 205A, end node 205A determines the size of the received packets 220 and whether characteristics common to the received packets 220 will enable aggregation into a single AS packet 215 for transport across AS fabric 200. Common characteristics may include same source/destination, same Quality of Service ("QoS"), and the like. The received packets 220 need not be members of a single flow, as long as, sufficient characteristics are common to allow group transportation across AS fabric 200.

The processes explained below are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like. The order in which some or all of the process blocks appear in each process should not be deemed limiting. Rather, one of ordinary skill in the art having the benefit of the present disclosure will understand that some of the process blocks may be executed in a variety of orders not illustrated.

Figure 3:
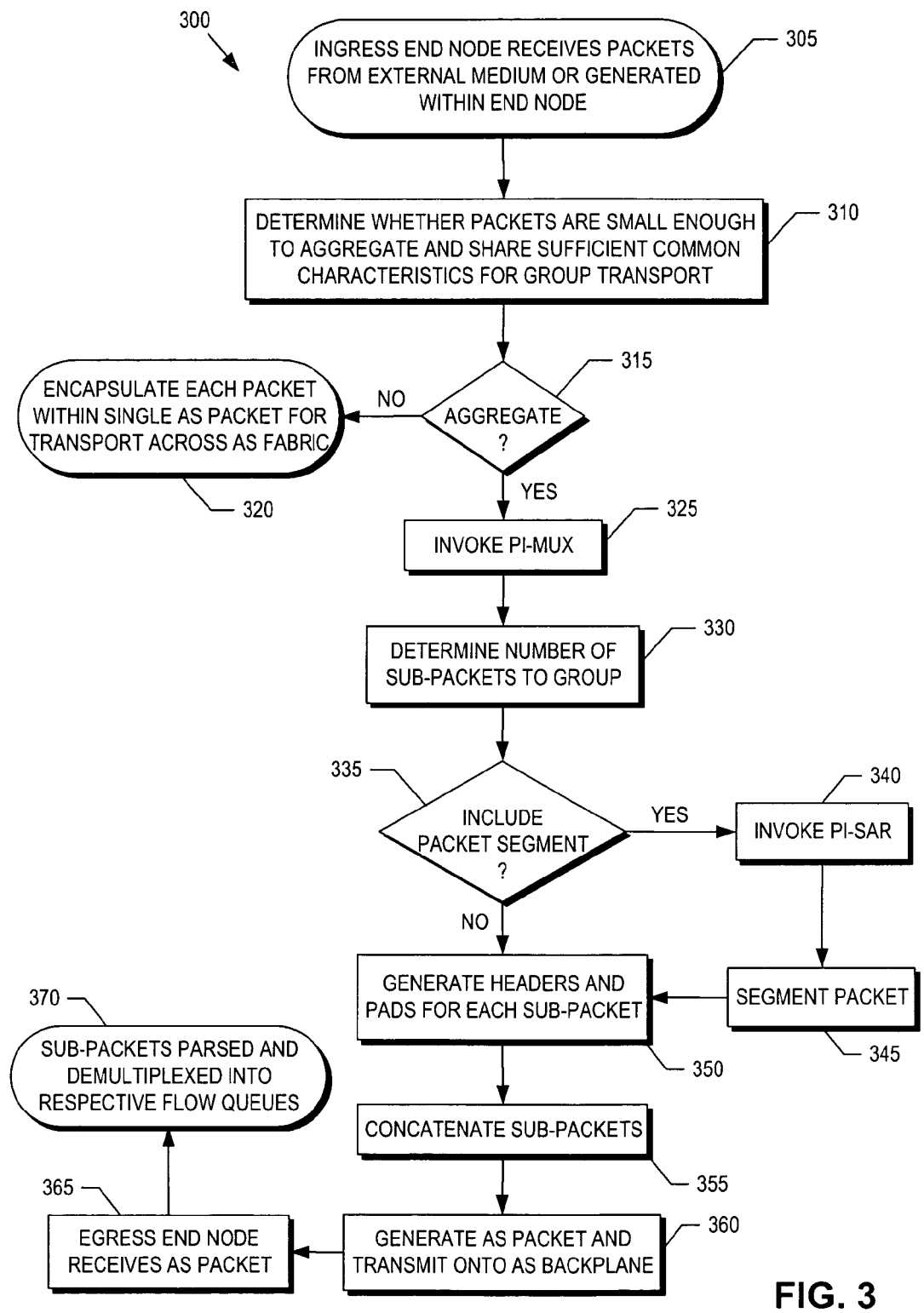
FIG. 3 is a flow chart illustrating a process for aggregating multiple packets received from a network into a single AS packet for transport across an AS fabric, in accordance with an embodiment of the present invention.

FIG. 3 is a flow chart illustrating a process 300 for aggregating multiple small packets received from external media 225 or created within an end node 205 into a single AS packet 215 for group transport across AS fabric 200, in accordance with an embodiment of the present invention. "Small packets" in this context may include the first or last segment of a larger packet that was segmented for transport across AS fabric 200.

In a process block 305, ingress end node 205A receives packets 220 from external medium 225 and/or from sources internal to ingress end node 205A. In a process block 310, end node 205A determines whether multiple received packets 220 are small enough to fit within a packet data unit ("PDU") of a single AS packet 215 and whether the multiple received packets 220 share sufficient common characteristics for group transport. If end node 205A determines either that the received packets 220 are not small enough to aggregate or they do not share sufficient common characteristics, then process 300 continues to a process block 320 from decision block 315. In process block 320, the individual received packets 220 are encapsulated and tunneled/transported across AS fabric 200 within corresponding individual AS packets.

Returning to decision block 315, if the received packets 220 are sufficiently small and share sufficiently similar characteristics, then process 300 continues to a process block 325. In process block 325, the PI-MUX is invoked by AS transaction layer 120 to commence aggregation.

In a process block 330, a number of the received packets 220 is computed for encapsulating within sub-packets to be concatenated into a single AS packet 215. In one embodiment, the number of packets 220 to aggregate is determined prior to generation of each AS packet 215, based on the currently buffered received packets 220. In one embodiment, received packets 220 are added into an AS packet being generated as packets 220 become available, without first buffering all packets to be concatenated together within a single AS packet 215. The number of received packets 220 to aggregate within a single AS packet 335 may depend upon the maximum packet size ("MPS") of AS fabric 200 and the size(s) of packets 220 (note packets 220 may be of variable size), as well as, the arrival timing/intervals and availability of received packets 220.

Figure 4:
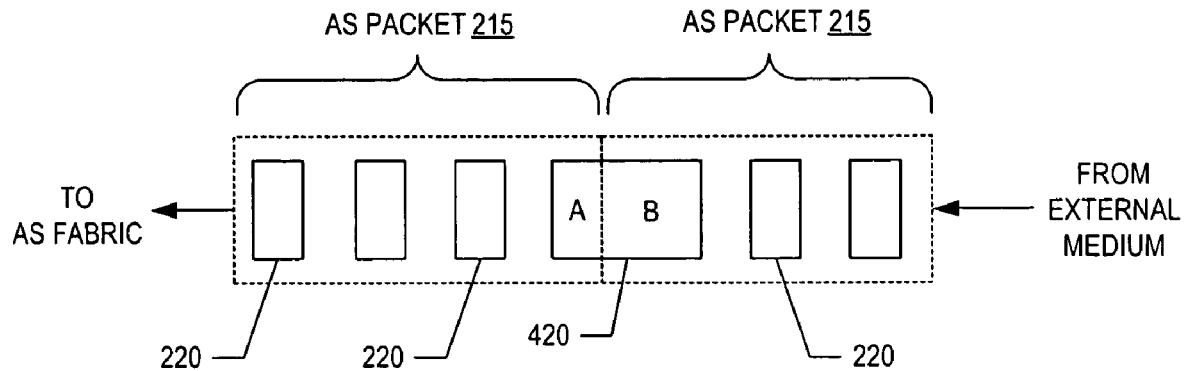
FIG. 4 is a block diagram illustrating aggregation of packets received from an external medium into a single AS packet, in accordance with an embodiment of the present invention.

FIG. 4 is a block diagram illustrating aggregation of packets 220 received from one of external media 225, in accordance with an embodiment of the present invention. As illustrated, the PI-MUX can aggregate multiple small packets 220 into a single AS packet 215. However, as illustrated, embodiments of the present invention further include the ability to concatenate a segment of a larger packet 420 received from one of external media 225 along with one or more small packets 220 within a single AS packet 215. Incorporation of a segment into an AS packet 215 along with other small packets 220 increases bandwidth utilization by reducing the number of AS packets 215 transmitted across AS backplane 210 with wasted padding.

Returning to FIG. 3, in a decision block 335, AS transaction layer 120 determines whether to include a segment of a larger packet, such as segment "A" of large packet 420. Again, this determination may made based on the availability or lack of availability of other small packets 220 to aggregate and/or the leftover space within an AS packet 305 after aggregating available small packets 220. Furthermore other available small packets 220 may be precluded from bypassing large packet 420 due to ordering constraints. If segment A of large packet 420 is to be included, then process 300 continues to a process block 340.

In process block 340, a segmentation and reassembly ("SAR") protocol interface ("PI-SAR") (e.g., PI-2 of table 130) is invoked to segment large packet 420 (process block 345). In one embodiment, the determination of which packets 220 or 420 to aggregate is executed prior to SARing decisions. In a process block 350, headers and an optional pad are generated to encapsulate each received packet 220 (or packet segment) to generate sub-packets to be concatenated within a single AS packet.

Figure 5:
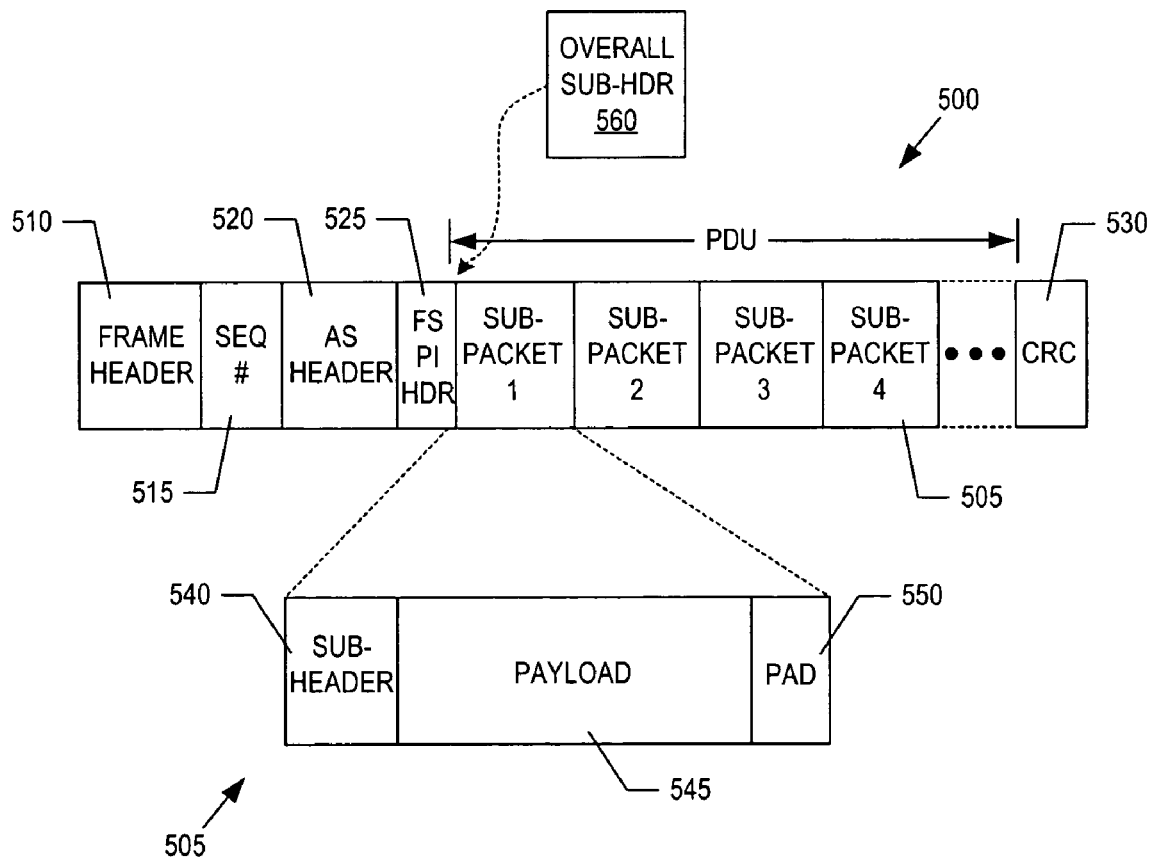
FIG. 5 is a block diagram illustrating fields of an AS packet carrying multiple sub-packets therein, in accordance with an embodiment of the present invention.

FIG. 5 is a block diagram illustrating fields of an AS packet 500 carrying multiple sub-packets 505 therein, in accordance with an embodiment of the present invention. AS packet 500 is one possible embodiment of AS packets 215. The illustrated embodiment of AS packet 500 is generated with use of the PI-MUX service protocol of the AS fabric 200 and includes a frame header 510, a sequence number 515, an AS header 520, fabric services PI headers 525, multiple sub-packets 505, and an error checking field 530 (e.g., cyclical redundancy checking).

In one embodiment, frame header 510, sequence number 515, and error checking field 530 are link level constructs generated and consumed by data link layers 110 of two link level partners within AS fabric 200. Frame header 510 may include a frame delineator to demark the division between consecutive AS packets 215 received on a single link within AS fabric 200. Sequence number 515 may be used to track sequential AS packets 215 transmitted between link peers within AS fabric 200 (e.g., links among AS switches within AS backplane 210 and links between end nodes 225 and switches within AS backplane 210).

In one embodiment, AS header 520 and fabric service PI headers 525 are transaction level constructs generated by AS transaction layer 120 and AS fabric services layer 123. AS header 520 and fabric service PI headers 525 are generated and consumed by end nodes 205. In one embodiment, AS header 520 may include destination information, source information, length data, frame type, and QoS information. Fabric service PI headers 525 may include one or more PI codes indicating the protocol type of the PDU and what fabric services to apply to AS packet 500. In one embodiment, the fabric service PI headers 525 includes the PI code assigned to the PI-MUX protocol. Fabric service headers 525 may further include multiple PI codes linked together (e.g., PI-MULTI-CASTING and PI-MUX). Fabric service PI headers 525 may include other information, such as a transaction level sequence number for SAR functionality.

Each sub-packet 505 includes a sub-header 540, a payload 545, and optionally a pad 550. Payload 545 represents the encapsulated packets 220 or segment A of large packet 420. Pad 550 may be appended to a payload 545 to round up the overall length of a sub-packet 505 to a standard or predefined size (e.g., 4 or 8 bytes), or to a predefined boundary. Ensuring that sub-packets 505 are each a standard size or multiples of the standard size simplifies demultiplexing/disaggregation processing at the egress end node (e.g., end node 205C).

In one embodiment, sub-header 540 includes one or more of a payload identifier, a traffic identifier, a length index, and a sequence number. The payload identifier identifies a protocol type of payload 545 (e.g., TCP, UDP, IP, etc.) and is often referred to as the PROTO field. The traffic identifier identifies either a flow or a logical queue into which payload 454 will be demultiplexed/disaggregated at the egress end node (e.g., end node 205C). The traffic identifier may also correspond to the flow or logical queue from which the particular packet 220 was multiplexed at the ingress end node (e.g., end node 205A). The length index identifies a length of payload 545. In an embodiment where sub-packets 505 include pads 550, the length index may identify a length of payload 545 plus a length of pad 550. Finally, the sequence number of sub-header 540 identifies an order of payload 545 from other payloads previously disaggregated or to be disaggregated into the same flow or logical queue at an egress end node. A sequence number at the sub-packet level ensures that small packets 220 or segments of a single large packet 420 are not received out of order at an egress end node or lost entirely. In yet another embodiment, sub-header 540 may piggyback signaling information unrelated to payload 545 to be communicated between end nodes 225. It should be appreciated that embodiments of the present invention need not include all of the above listed fields within sub-header 540, or may contain other specialized fields not listed above tailored to a particular implementation.

In one embodiment, an overall sub-header 560 is included within the PDU of AS packet 500. In this embodiment, overall sub-header 560 may include general metadata regarding sub-packets 505 or carry signaling information communicated between end nodes 225. For example, the metadata may include the number of sub-packets 505, a length of each sub-packet 505, and/or total length of all sub-packets 505 within the PDU. Overall sub-header 560 may be incorporated to supplement the information provided in each sub-header 540, thereby reducing the size of each sub-header 540 and the amount of header data carried therein. Alternatively, overall sub-header 560 may entirely replace all sub-headers 540 and therefore each sub-packet 505 would only include payload 545 and optionally pad 550.

In one embodiment, sub-headers 540 may be simple indexes or handles pointing to (or otherwise correlated with) header information already stored within memory of an egress end node 205. In this embodiment, the header information would be transferred to the egress end node in an earlier AS packet and stored in a defined location. In another embodiment, the header information would be transferred to egress end node 205 by a management agent operating at some location within AS fabric 200 or within egress end node 205. Subsequently, the sub-headers 540 would be parsed to obtain the index or handle containing information used to access the stored header data. In an alternative embodiment, the positioning of each sub-packet 505 within AS packet 500 is used to correlate a particular sub-packet 505 with the header information stored at the egress end node 205. Implementing sub-headers 540 with index values (or handles) may help reduce link overhead and increase throughput bandwidth in certain applications.

Figure 6:
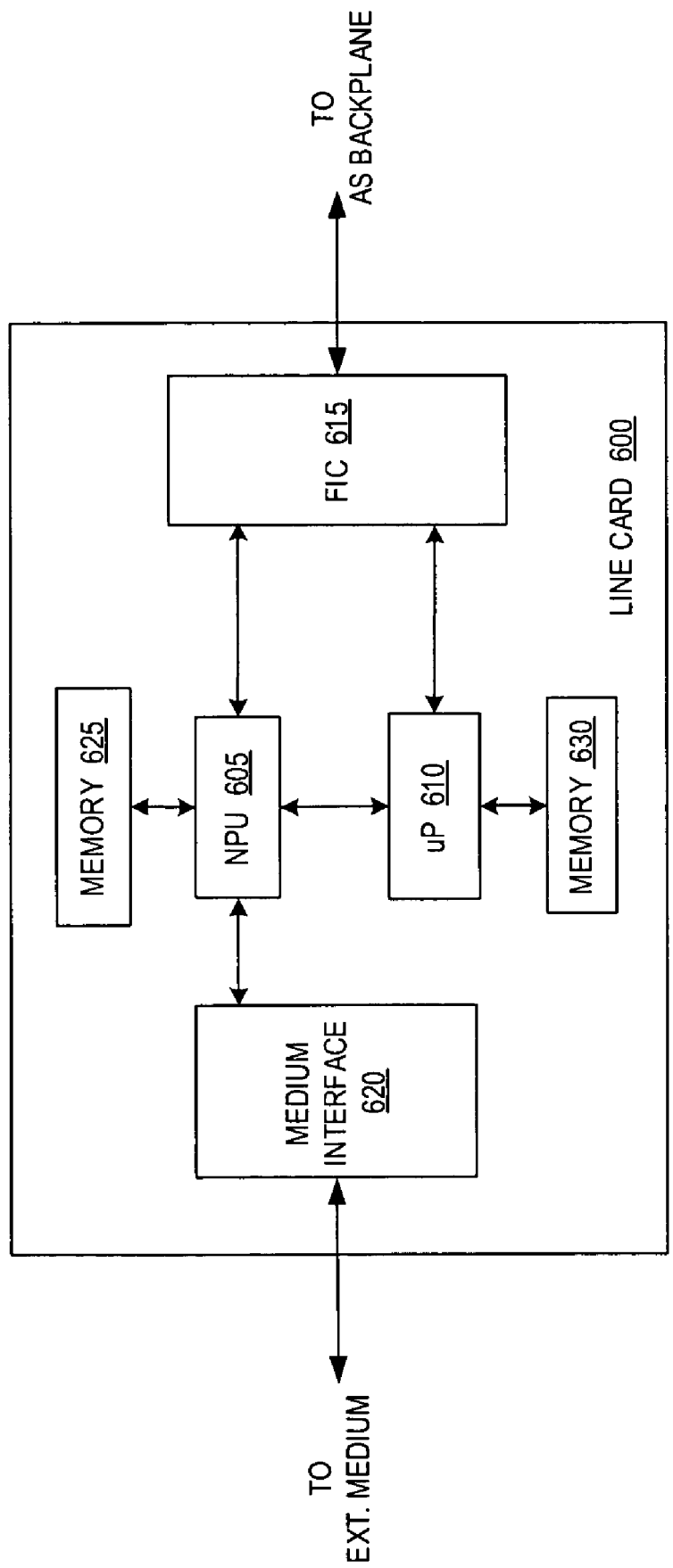
FIG. 6 is a block diagram illustrating a line card to implement packet aggregation over an AS fabric, in accordance with an embodiment of the present invention.

FIG. 6 is a block diagram illustrating a line card 600 to implement packet aggregation over AS fabric 200, in accordance with an embodiment of the present invention. The illustrated embodiment of line card 600 includes a network processing unit ("NPU") 605, a processor 610, an AS fabric interface controller ("FIC") 615, a medium interface 620, and memories 625 and 630. Line card 600 is a representative embodiment of end nodes 205.

Medium interface 620 couples to one of media 225 to receive/transmit packets 220 (and large packets 420) between them. Medium interface 620 may include a framer or a media access controller ("MAC") component, and a physical layer ("PHY") component. Medium interface 620 is coupled to NPU 605 to communicate therewith via a communication link, such as SPI-4.2, while NPU 605 and processor 610 may communicate with each other via a communication link, such as PCI Express. In the illustrated embodiment, processor 610 further couples to FIC 615 via a communication link (e.g., PCI Express) and NPU 605 also couples to FIC 615 via a communication link (e.g., CSIX, SPI-4.2, etc.). NPU 605 is coupled to memory 625 to execute instruction stored therein and store packet and program related data. In one embodiment, memory 625 contains instructions to implement AS transaction layer 120 and the packet aggregation techniques described herein. Processor 610 may be provided to execute management functionality on AS fabric 200 and may provide management of line card 600 as well as control and content processing functionality.

Figure 7:
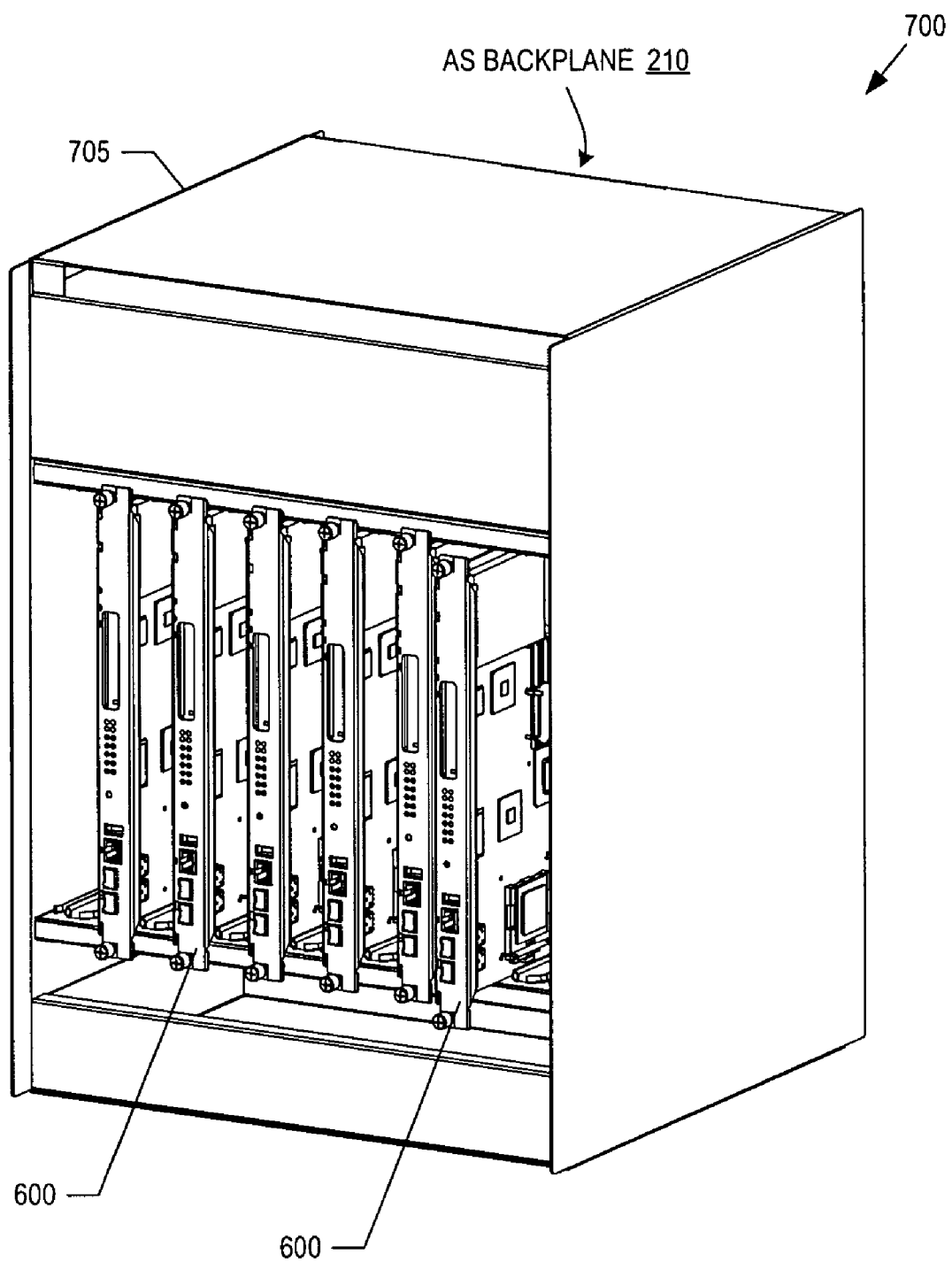
FIG. 7 illustrates an isometric view of a demonstrative system including line cards coupled to an AS backplane to implement packet aggregation over an AS fabric.

FIG. 7 is an isometric view of a demonstrative system 700 including embodiments of line cards 600 coupled to an AS backplane 210. System 700 includes a chassis 705 to mount line cards 600 and AS backplane 210 (not shown) to interconnect line card 600. In one embodiment, chassis 705 is a blade server rack and line cards 600 represent individual blade servers. In one embodiment, chassis 705 is an Advanced Telecom Computer Architecture ("ATCA") chassis and line cards 600 represent ATCA boards. In one embodiment, AS backplane 210 is implemented as a mesh architecture with AS switch elements on each line card 600. In another embodiment, AS backplane 210 is implemented as an AS switch element mounted on a switch card, which then connects other line cards 600 in a star topology. In this star topology embodiment, two switch cards may be coupled in a dual-star topology to provide for a more robust system, with each switch card connect to a different AS port on each of line cards 600. In one embodiment, AS backplane 210 is implemented with a high-speed serial interface.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    defining a protocol interface ("PI") to aggregate a plurality of packets received from a medium into a single Advanced Switching ("AS") packet;
    determining a size of each of the plurality of packets and a common characteristic among each of the plurality of packets to enable aggregation of the plurality of packets;
    invoking the PI to aggregate the plurality of packets according to the size of each of the plurality of packets and common characteristic among each of the plurality of packets, the PI capable to aggregate a segment of a received first packet with a received second packet; and
    transmitting the AS packet onto an AS fabric, wherein the PI is defined in addition to a standard set of AS PI's.

2. The method of claim 1, wherein the common characteristic among each of the plurality of packets includes at least one of a common source, a common destination and same Quality of Service "QoS."

3. The method of claim 1, wherein aggregating the plurality of packets into a single AS packet comprises:
    encapsulating each of the plurality of packets within a sub-packet;
    concatenating the sub-packets; and
    generating the AS packet incorporating the concatenated sub-packets.

4. The method of claim 3, wherein each of the sub-packets encapsulates an entire one of the plurality of packet.

5. The method of claim 3, wherein at least one of the sub-packets encapsulates an entire one of the plurality of packets and at least one of the sub-packets encapsulates only a segment of one of the plurality of packets to allow the segment of the received first packet to be aggregated with the received second packet.

6. The method of claim 5, wherein aggregating the plurality of packets into a single AS packet further comprises invoking a Segmentation And Reassembly ("SAR") service provided by the AS fabric to segment the one of the plurality of packets having the segment encapsulated within at least one of the sub-packets.

7. The method of claim 6, wherein SARing decisions are executed after aggregation decisions.

8. The method of claim 3, wherein the sub-packets comprise a sub-header and a payload having one of the plurality of packets contained therein, the sub-header comprising:
    a payload identifier to identify a protocol type of the payload;
    a traffic identifier to identify one of a flow and a logical queue into which to disaggregate the payload;
    a length index to identify a length of the payload; and
    a sequence number to identify an order of the payload from other payloads disaggregated into the same one of the flow and the logical queue.

9. The method of claim 8, wherein the sub-packets further include a pad portion to round up a length of the sub-packets to a standardized length.

10. The method of claim 3, wherein the AS packet further includes an overall sub-header identifying a plurality of the sub-packets aggregated within the AS packet and including header information about the plurality of the sub-packets.

11. The method of claim 10, wherein the header information includes at least one of a payload identifier, a traffic identifier, a length index, and a sequence number for each of the identified plurality of the sub-packets, and wherein the sub-header of each of the identified plurality of the sub-packets does not include at least a portion of the header information included within the overall sub-header.

12. The method of claim 3, further comprising:
    storing sub-header information including at least one of a payload identifier, a traffic identifier, a length index, and a sequence number at an egress end node communicatively coupled to the AS fabric; and
    correlating the sub-header information with at least one of the sub-packets.

13. The method of claim 12, wherein correlating the sub-header information with at least one of the sub-packets comprises correlating the sub-header information with at least one of the sub-packets via sub-packet position within the AS packet.

14. The method of claim 12, wherein correlating the sub-header information with at least one of the sub-packets comprises correlating the sub-header information with at least one of the sub-packets via correlation information included within the at least one of the sub-packets.

15. The method of claim 1, wherein aggregating the plurality of packets into a single AS packet comprises aggregating the plurality of packets received from the medium using a variety of different transport protocols into a single AS packet.

16. The method of claim 1, wherein the AS fabric comprises an AS backplane switching fabric.

17. A computer readable medium having encoded, stored or embodied thereon computer executable instructions that, if executed by a machine, will cause the machine to perform operations comprising:

receiving a plurality of packets from a medium;
defining a service protocol interface ("PI") to aggregate the plurality of packets into a single Advanced Switching ("AS") packet using the defined service PI, wherein the defined service PI is defined in addition to a standard set of AS PI's;
determining a size of each of the plurality of packets and a common characteristic among each of the plurality of packets to enable aggregation of the plurality of packets;
invoking the PI to aggregate the packets according to the size of each of the plurality of packets and common characteristic among each of the plurality of packets, the PI capable to aggregate a segment of a received first packet with a received second packet; and
transmitting the AS packet onto the AS fabric.

18. The computer readable medium of claim 17, wherein aggregating the plurality of packets into the single AS packet comprises:
encapsulating each of the plurality of packets within a sub-packet;
concatenating the sub-packets; and
generating the AS packet incorporating the concatenated sub-packets.

19. The computer readable medium of claim 18, wherein at least one of the sub-packets encapsulates an entire one of the plurality of packets received from the medium and at least one of the sub-packets encapsulates only a segment of one of the plurality of packets.

20. The computer readable medium of claim 19, wherein aggregating the plurality of packets into a single AS packet further comprises invoking a Segmentation And Reassembly ("SAR") service provided by the AS fabric to segment the one of the plurality of packets having only the segment encapsulated within at least one of the sub-packets.

21. The computer readable medium of claim 19, wherein the sub-packets comprise a sub-header and a payload having one of the plurality of packets contained therein, the sub-header comprising:
a payload identifier to identify a protocol type of the payload;
a traffic identifier to identify one of a flow and a logical queue to disaggregate the payload into;
a length index to identify a length of the payload; and
a sequence number to identify an order of the payload from other payloads disaggregated into the same one of the flow and the logical queue.

22. The computer readable medium of claim 19, wherein the AS packet further includes an overall sub-header identifying a number of the sub-packets aggregated within the AS packet and a length of each of the sub-packets.

23. The computer readable medium of claim 17, wherein aggregating the plurality of packets into a single AS packet comprises aggregating the plurality of packets received from the medium using a variety of different transport protocols into a single AS packet.

24. An apparatus, comprising:
a medium interface to receive packets from a medium;
an Advanced Switching ("AS") switch element linked in communication with the medium interface and including a connection to couple to an AS fabric;
a network processor unit ("NPU") linked in communication with the AS switch element; and
a memory device having instructions stored therein, which if executed by the NPU, will cause the NPU to perform operations comprising:
receiving the packets from the medium;
defining a service protocol interface ("PI") to aggregate the packets into a single AS packet using the defined service PI, wherein the defined service PI is defined in addition to a standard set of AS PI's;
determining a size of each of the packets and a characteristic common among each of the packets to enable aggregation of the packets;
invoking the service PI to aggregate the packets according to the size of each of the packets and a characteristic common among each of the packets, the PI capable to aggregate a segment of a received first packet with a received second packet; and
transmitting the AS packet onto the AS fabric.

25. The apparatus of claim 24, wherein aggregating the packets into the single AS packet comprises:
encapsulating each of the packets within a sub-packet;
concatenating the sub-packets; and
generating the AS packet incorporating the concatenated sub-packets.

26. The apparatus of claim 25, wherein encapsulating each of the packets within a sub-packet comprises encapsulating an entire one of the packets within one of the sub-packets and encapsulating only a segment of one of the packets within another one of the sub-packets.

27. The apparatus of claim 26, wherein aggregating the packets into a single AS packet further comprises invoking a Segmentation And Reassembly ("SAR") service provided by the AS fabric to segment the one of the packets having the segments encapsulated within the another one of the sub-packets.

28. A system, comprising:
a chassis including a interconnect;
a first end node coupled to the interconnect;
a second end node coupled to the interconnect; and
at least one switching device coupled to the interconnect comprising an Advanced Switching ("AS") fabric,
wherein the first end node includes a component, which if executed by the first end node, will cause the first end node to perform operations comprising:
receiving packets from an external medium coupled to the first end node;
defining a protocol interface ("PI") to aggregate the packets into a single AS packet using the defined PI, wherein the defined PI is defined in addition to a standard set of AS PI's;
determining a size of each of the packets and a common characteristic among each of the packets to enable aggregation of the packets;
invoking the PI to aggregate the packets according to the size of each of the packets and the common characteristic among each of the packets, the PI capable to aggregate a segment of a received first packet with a received second packet; and
transmitting the AS packet onto the AS fabric.

29. The system of claim 28, wherein aggregating the packets into the single AS packet comprises:
encapsulating each of the packets within a sub-packet;
concatenating the sub-packets; and
generating the AS packet incorporating the concatenated sub-packets.

30. The system of claim 29, wherein the interconnect comprises a backplane.

31. The system of claim 30, wherein the chassis comprises an Advanced Telecom Computer Architecture ("ATCA") chassis and the end first and second nodes comprise ATCA boards.

32. The system of claim 30, wherein the end first and second nodes comprise blade servers and the chassis comprises a rack of the blade servers.

* * * * *